(12) United States Patent
Zeroug et al.

(10) Patent No.: US 9,784,875 B2
(45) Date of Patent: Oct. 10, 2017

(54) METHOD TO ESTIMATE CEMENT ACOUSTIC WAVE SPEEDS FROM DATA ACQUIRED BY A CASED HOLE ULTRASONIC CEMENT EVALUATION TOOL

(71) Applicant: Schlumberger Technology Corporation, Sugar land, TX (US)

(72) Inventors: Smaine Zeroug, Lexington, MA (US); Jiaqi Yang, Belmont, MA (US); Sandip Bose, Brookline, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 305 days.

(21) Appl. No.: 14/612,101

(22) Filed: Feb. 2, 2015

(65) Prior Publication Data

US 2015/0218930 A1  Aug. 6, 2015

Related U.S. Application Data

(60) Provisional application No. 61/934,606, filed on Jan. 31, 2014.

(51) Int. Cl.
| | | |
|---|---|---|
| *G01V 1/00* | (2006.01) | |
| *G01V 1/50* | (2006.01) | |
| *E21B 47/00* | (2012.01) | |
| *E21B 47/14* | (2006.01) | |

(52) U.S. Cl.
CPC ............ *G01V 1/50* (2013.01); *E21B 47/0005* (2013.01); *E21B 47/14* (2013.01)

(58) Field of Classification Search
CPC ........ G01V 1/50; E21B 47/0005; E21B 47/14
See application file for complete search history.

(56) References Cited

U.S. PATENT DOCUMENTS

| | | | | |
|---|---|---|---|---|
| 4,255,798 A | * | 3/1981 | Havira | ............... E21B 47/0005 |
| | | | | 181/105 |
| 6,483,777 B1 | * | 11/2002 | Zeroug | ............... E21B 47/0005 |
| | | | | 367/35 |

(Continued)

OTHER PUBLICATIONS

S. Zeroug and B. Forelich, "Ultrasonic leaky-lamb wave imaging through a highly contrasting layer," in 2003 IEEE Symposium on Ultrasonic pp. 794-798, vol. 1.

(Continued)

*Primary Examiner* — Hovhannes Baghdasaryan
(74) *Attorney, Agent, or Firm* — Michael Dae

(57) ABSTRACT

Embodiments of the disclosure may include systems and methods for estimating an acoustic property of an annulus in a cement evaluation system. In one embodiment, a casing arrival signal is acquired at acoustic receivers a cement evaluation tool. A spectral amplitude ratio is calculated based on the casing arrival signal. The spectral amplitude ratio is scanned to detect and identify discontinuities. If discontinuities are detected, the frequency at the discontinuity may be used to estimate a wavespeed of the annulus. If discontinuities are not detected, attenuation dispersions are calculated and estimated, and an estimated wavespeed and parameters are updated until the calculated and estimated attenuation dispersions match.

20 Claims, 11 Drawing Sheets

(56) References Cited

U.S. PATENT DOCUMENTS

2004/0122595 A1\* 6/2004 Valero .................... G01V 1/366
  702/11
2006/0133205 A1\* 6/2006 Van Kuijk .......... E21B 47/0005
  367/35

OTHER PUBLICATIONS

R. van Kuijik, et al, "A Novel Ultrasonic Cased-Hole Imager for Enhanced Cement Evaluation," International Petroleum Technology Conference Sep. 21-23, 2005, Doha, Qatar.

\* cited by examiner

METHOD TO ESTIMATE CEMENT ACOUSTIC WAVE SPEEDS FROM DATA ACQUIRED BY A CASED HOLE ULTRASONIC CEMENT EVALUATION TOOL

This application claims the priority of U.S. Provisional Application 61/934,606, filed on Jan. 31, 2014.

BACKGROUND

This disclosure relates to measuring material properties, and, more particularly to, systems and methods for estimating cement acoustic wave speeds.

A wellbore drilled into a geological formation may be targeted to produce oil and/or gas from certain zones of the geological formation. To prevent zones from interacting with one another via the wellbore and to prevent fluids from undesired zones entering the wellbore, a casing may be inserted into the wellbore and sections of the well may be cemented by injecting the annulus formed between the cylindrical casing and the geological formation with cement. The cement ensures the stability of the wellbore, prevents fluid migration between zones of the geological formation, and minimizes the rate of fluid-induced casing corrosion. Injection of the cement involves a number of factors, including the design and the pumping of the cement slurry, contamination of the cement-slurry by the drilling mud, a bad casing centralization, and so on.

Acoustic evaluation of the cement may determine whether cement has been placed in the annulus between the casing and the formation, and whether the cement provides zonal isolation between the formation traversed by the drilled well. A variety of acoustic tools may be used to evaluate the cement after installation. These acoustic tools may include ultrasonic tools operated in fluid-filled casing. For example, an ultrasonic tool, such as Schlumberger Wireline's Isolation Scanner™ tool, may be lowered through the wellbore and rotated to provide vertical and azimuthal imaging of the cement. The cement may be evaluated using acoustic impedance measurements and, for some tools, the casing flexural mode attenuation.

The decay of the flexural mode amplitude is one type of parameter used in the commercial processing of the Isolation Scanner data to determine the cement properties. This decay is estimated from the ratio of the peak of the envelope of the flexural mode amplitude at the two receivers. However, by itself, this energy envelope decay rate leads to an ambiguous answer as the same value can correspond to a cement with a low acoustic impedance as well as one with higher acoustic impedance (ie, the inversion result is double valued). To remove the ambiguity, the decay may be combined with the estimated cement acoustic impedance resulting from processing of the pulse-echo measurement. However, the latter estimation is not always robust due to the strong sensitivity of the inversion method to environmental effects such as mud acoustic impedance as well as to modeling results-based corrections stemming from the inversion reliance on a one-dimensional model for the measurement.

SUMMARY

Embodiments of this disclosure relate to various methods and systems for evaluating cement in gas and oil wells. According to some embodiments, a method for estimating an acoustic property of an annulus in a cement evaluation system includes acquiring, at a plurality of acoustic receivers in the cement evaluation system, acoustic waveforms that have propagated through a casing, the annulus, or both. The method further includes extracting, from the acoustic waveforms, a casing arrival signal including portions of the acoustic waveforms that have propagated through the casing, wherein the casing arrival signal substantially excludes portions of the acoustic waveforms arising from reflections from the annulus or reflections at an interface of the annulus and a formation surrounding the annulus. The method includes calculating an attenuation dispersion (which may be a spectral amplitude ratio in some embodiments) of the casing arrival signal based on portions of the casing arrival signal received at a first receiver and a second receiver of the plurality of acoustic receivers and detecting a discontinuity in the attenuation dispersion. If a discontinuity is detected, a frequency may be estimated at the detected discontinuity. Further, if a discontinuity is detected, a phase velocity dispersion of the casing arrival signal may be calculated. The wavespeed of the annulus may be estimated based on the estimated frequency and estimated phase velocity dispersions.

According to another embodiment, a method for estimating an acoustic property of an annulus in a cement evaluation system is provided. The method includes acquiring, at a plurality of acoustic receivers in the cement evaluation system, a pitch-catch signal comprising acoustic waveforms that have propagated through a casing adjacent to the annulus. A casing arrival signal may then be extracted from the pitch-catch signal, wherein the casing arrival signal includes early-arriving portions of the pitch-catch signal, and wherein the casing arrival signal is substantially devoid of later-arriving portions arising from reflections from the annulus or reflections from an interface of the annulus and a formation around the annulus. The method then includes compensating each casing arrival signal for lateral beam spreading using a lateral-beam spreading formula, calculating a first attenuation dispersion of the compensated casing arrival signals based on portions of the casing arrival signal received at each receiver of the plurality of acoustic receivers, and calculating a second attenuation dispersion for the casing arrival signals using a mode search algorithm, based on guessed cement properties, wherein the mode search algorithm assumes a cement sheath having an infinite thickness. The method then involves calculating a mismatch between the first and second attenuation dispersions and updating the guessed cement properties until the mismatch is reduced below a threshold and outputting the updated cement properties once the mismatch is reduced below a threshold.

According to another embodiment, a non-transitory tangible computer-readable storage medium having stored executable computer code can be provided. The code can include a set of instructions that causes one or more processors to perform the following operations: identifying a casing arrival signal from waveforms received at a first receiver and a second receiver in a cement evaluation system, calculating a spectral amplitude ratio based on a relationship between waveforms received at the first receiver and the second receiver, scanning the spectral amplitude ratio in a frequency domain to identify discontinuities in the spectral amplitude ratio, identifying a frequency at which a first discontinuity occurs in the spectral amplitude ratio, and estimating wavespeed based on the identified frequency.

According to another embodiment, a cement evaluation system for evaluating gas-contaminated cement can be provided. The system can include one or more processors and a non-transitory tangible computer-readable memory coupled to the one or more processors and having stored executable computer code stored. The code can include a set of instructions that causes the one or more processors to perform the following operations: identifying a casing arrival signal from waveforms received at a first receiver and a second receiver in a cement evaluation system, calculating a spectral amplitude ratio based on a relationship between waveforms received at the first receiver and the second receiver, scanning the spectral amplitude ratio in a frequency domain to identify discontinuities in the spectral amplitude ratio, identifying a frequency at which a first discontinuity occurs in the spectral amplitude ratio, and estimating wavespeed based on the identified frequency.

Various refinements of the features noted above may be undertaken in relation to various aspects of the present disclosure. Further features may also be incorporated in these various aspects as well. These refinements and additional features may be determined individually or in any combination. For instance, various features discussed below in relation to the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Described herein are various embodiments related to techniques for processing data acquired with an ultrasonic cement evaluation tool, such as Schlumberger's Isolation Scanner™ tool. These techniques may be used on modeling and field data results to estimate the cement wavespeed, either compressional or shear, to evaluate cement conditions. The techniques may also be used to determine cement impedance, as well as other conditions or characteristics of the annulus. As used herein, annulus may refer to any material suitable for filling the annular area between a casing and a formation in a wellbore. For example, cement is a material commonly used as the annulus. While the examples described herein may refer to the annulus or the cement, the present techniques are not limited to estimating a wavespeed in cement, but are applicable to estimating wavespeed for any suitable annulus material.

Knowledge of the wavespeeds in the annulus may provide quantitative information which may indicate the presence of solid cement in the annulus. In some embodiments, the estimated wavespeeds may also be inverted to predict the longevity of the cement sheath during the life of the well, particularly if measurements are taken in a time-lapse manner to monitor the time evolution of the mechanical strength of the cement sheath. Further, perturbations of the estimated dispersion information across depth zones or azimuthal ranges can be related to cement defects such as contamination by mud, cracking, as well as the existence of channels that may permit hydraulic channeling. Some embodiments of the present processing techniques may be also be applied to data acquired from a similar measurement to that of the Isolation Scanner™, conveyed either on Wireline tools or on a drilling string for Logging-While-Drilling (LWD) conditions. For example, processing data acquired during tipping of the drilling string across the cased cemented upper zones of the well may yield the time evolution of the cement wavespeed, which may indicate the degree of curing of the cement material. Such information can be valuable to assess zonal isolation and design cement formulations and cementing procedures for more effective zonal isolation.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Figure 1:
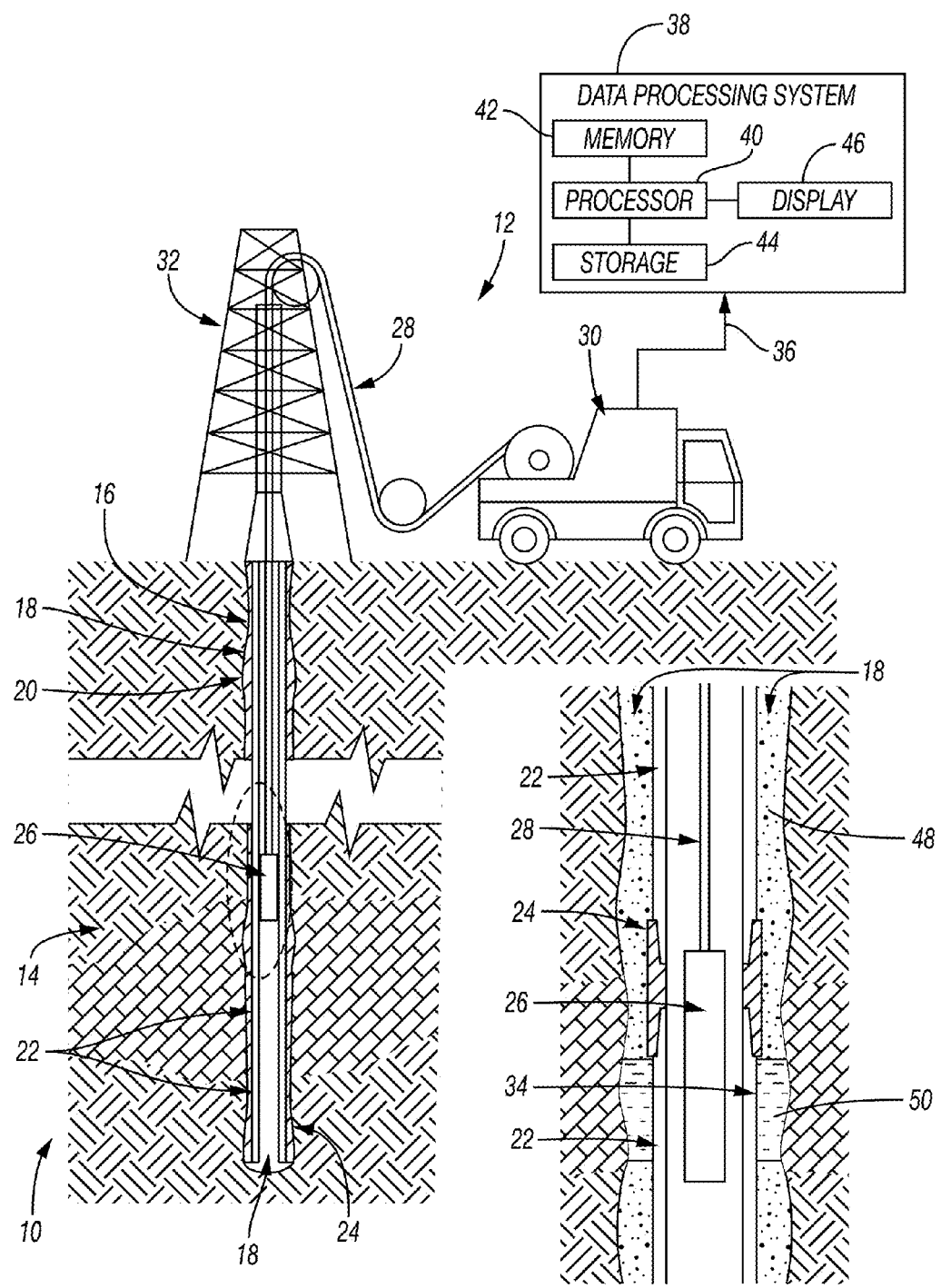
FIG. 1 is a schematic diagram of an example system for evaluating cement installation and zonal isolation of a well, in accordance with an embodiment of the disclosure.

FIG. 1 schematically illustrates an example system 10 for evaluating cement behind casing in a well. In particular, FIG. 1 illustrates surface equipment 12 above a geological formation 14. In the example of FIG. 1, a drilling operation has previously been carried out to drill a wellbore 16. In addition, an annular fill 18 (e.g., cement) has been used to seal an annulus 20—the space between the wellbore 16 and casing joints 22 and collars 24—with cementing operations.

As seen in FIG. 1, several casing joints 22 (also referred to below as casing 22 are coupled together by the casing collars 24 to stabilize the wellbore 16. The casing joints 22 represent lengths of pipe, which may be formed from steel or similar materials. In one example, the casing joints 22 each may be approximately 13 m or 40 ft. long, and may include an externally threaded (male thread form) connection at each end. A corresponding internally threaded (female thread form) connection in the casing collars 24 may connect two nearby casing joints 22. Coupled in this way, the casing joints 22 may be assembled to form a casing string to a suitable length and specification for the wellbore 16. The casing joints 22 and/or collars 24 may be made of carbon steel, stainless steel, or other suitable materials to withstand a variety of forces, such as collapse, burst, and tensile failure, as well as chemically aggressive fluid.

The surface equipment 12 may carry out various well logging operations to detect conditions of the wellbore 16. The well logging operations may measure parameters of the geological formation 14 (e.g., resistivity or porosity) and/or the wellbore 16 (e.g., temperature, pressure, fluid type, or fluid flowrate). Other measurements may provide acoustic cement evaluation data (e.g., flexural attenuation and/or acoustic impedance) that may be used to verify the cement installation and the zonal isolation of the wellbore 16. One or more acoustic logging tools 26 may obtain some of these measurements.

The example of FIG. 1 shows the acoustic logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the acoustic logging tool 26 may be conveyed using any other suitable conveyance, such as coiled tubing. The acoustic logging tool 26 may be, for example, an UltraSonic Imager (USI™) tool and/or an Isolation Scanner™ (IS) tool by Schlumberger.

The acoustic logging tool 26 may obtain measurements of acoustic impedance from ultrasonic waves and/or flexural attenuation. For instance, the acoustic logging tool 26 may obtain a pulse echo measurement that exploits the thickness mode (e.g., in the manner of an ultrasonic imaging tool) or may perform a pitch-catch measurement that exploits the casing flexural mode. The ultrasonic pitch-catch technique may be based on exciting and detecting from the casing quasi-Lamb modes with emphasis on the lowest-order antisymmetric mode (AO) often referred as the flexural mode. The casing flexural mode also radiates elastic energy into the annulus between casing and formation (or between a primary casing and a secondary one as it occurs for multiple string situations). When the annulus is filled with cement, either a shear wave only or both shear and compressional waves may be radiated into the cement layer, depending on the mechanical properties of the cement or annulus material.

The acoustic logging tool 26 may be deployed inside the wellbore 16 by the surface equipment 12, which may include a vehicle 30 and a deploying system such as a drilling rig 32.

Data related to the geological formation 14 or the wellbore 16 gathered by the acoustic logging tool 26 may be transmitted to the surface, and/or stored in the acoustic logging tool 26 for later processing and analysis. As will be discussed further below, the vehicle 30 may be fitted with or may communicate with a computer and software to perform data collection and analysis.

FIG. 1 also schematically illustrates a magnified view of a portion of the cased wellbore 16. As mentioned above, the acoustic logging tool 26 may obtain acoustic cement evaluation data relating to the presence of solids, liquids, or gases behind the casing 22. For instance, the acoustic logging tool 26 may obtain measures of acoustic impedance and/or flexural mode attenuation, which may be used to determine where the material behind the casing 22 is a solid (e.g., properly set cement) or is not solid (e.g., is a liquid or a gas). When the acoustic logging tool 26 provides such measurements to the surface equipment 12 (e.g., through the cable 28), the surface equipment 12 may pass the measurements as acoustic cement evaluation data 36 to a data processing system 38 (e.g., a cement evaluation system) that includes a processor 40, memory 42, storage 44, and/or a display 46. In other examples, the acoustic cement evaluation data 36 may be processed by a similar data processing system 38 at any other suitable location.

The data processing system 38 may collect the acoustic cement evaluation data 36 which may be evaluated to estimate the wavespeed (Vp) of the cement. To do this, the processor 40 may execute instructions stored in the memory 42 and/or storage 44. As such, the memory 42 and/or the storage 44 of the data processing system 38 may be any suitable article of manufacture that can store the instructions. The memory 42 and/or the storage 44 may be ROM memory, random-access memory (RAM), flash memory, an optical storage medium, or a hard disk drive, to name a few examples. The display 46 may be any suitable electronic display that can display the logs and/or other information relating to classifying the material in the annulus 20 behind the casing 22.

In this way, the acoustic cement evaluation data 36 from the acoustic logging tool 26 may be used to determine the presence of solid cement in the annular fill 18 has been installed as expected. In some cases, the acoustic cement evaluation data 36 may be evaluated to estimate cement wavespeed which may indicate that the cement of the annular fill 18 has a generally solid character (e.g., as indicated at numeral 48) and therefore has properly set. In other cases, the acoustic cement evaluation data 36 may indicate the potential absence of cement or that the annular fill 18 has a generally liquid or gas character (e.g., as indicated at numeral 50), which may imply that the cement of the annular fill 18 has not properly set. In some embodiments, the cement wavespeed may be inverted, particularly if the acoustic cement evaluation data 36 is taken in a time-lapse manner, to monitor the time evolution of the mechanical strength of the cement, and to predict the longevity of the cement during the life of the well. Furthermore, other characteristics of the cement may be determined based on a wavespeed estimated from the acoustic cement evaluation data 36.

Figure 2:
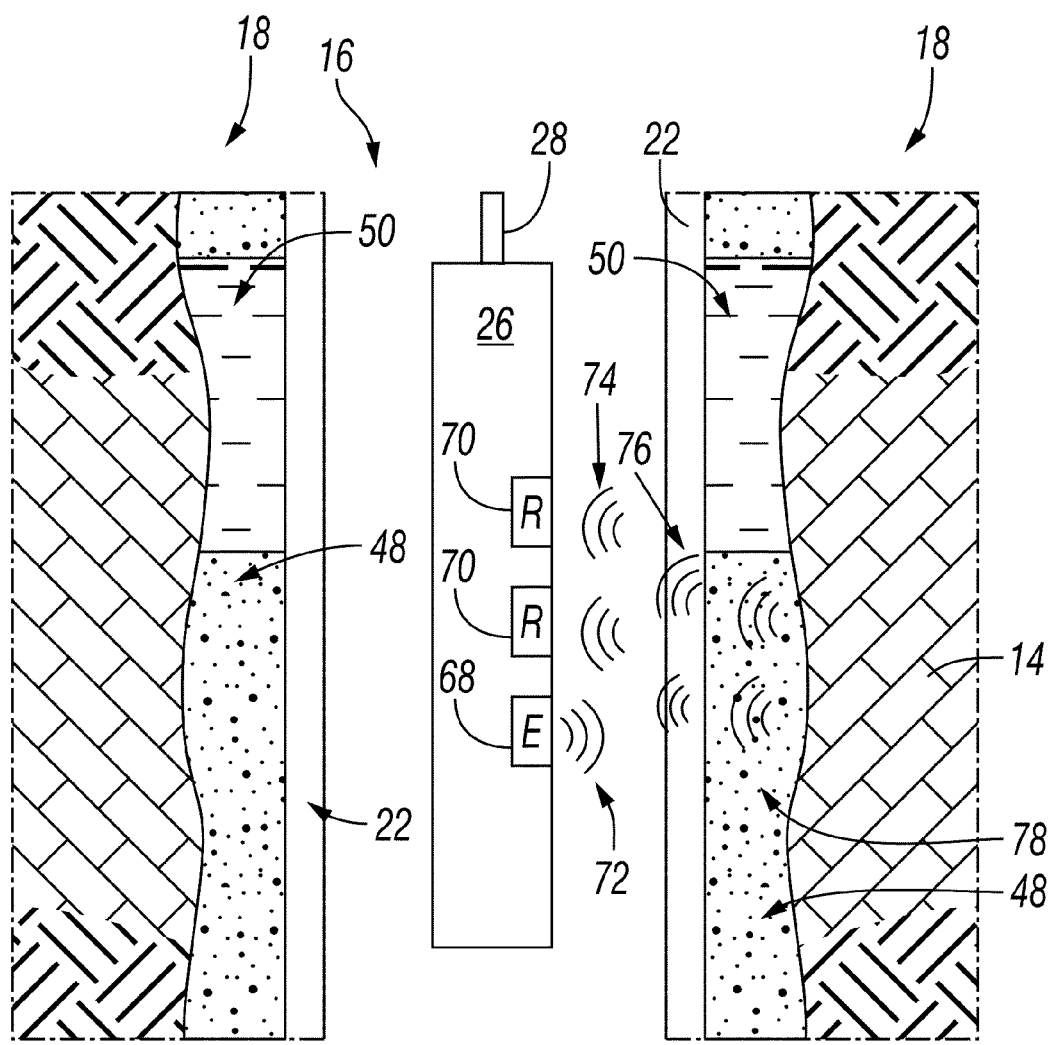
FIG. 2 is a block diagram of an example acoustic downhole tool to obtain acoustic cement evaluation data in accordance with an embodiment of the disclosure.

FIG. 2 provides an example embodiment of the acoustic logging tool 26 having a single emitter 68 and a pair of receiver transducers 70. The emitter 68 in the acoustic logging tool 26 may emit acoustic waves 72 out toward the casing 22 resulting in reflected waves 74, 76, and 78. In the embodiments shown in FIG. 2, the emitted energy excites a predominantly zeroth-order asymmetric mode (also referred to as flexural mode). As in the embodiment described above, the acoustic waves 72 propagate via transmission into both sides of the casing wall 22. The transmission in the casing annulus depends on the material on the outer side of the casing wall with a different amount of energy leak inside the annulus. The acoustic logging tool embodiment depicted in FIG. 2 may use measurements of acoustic impedance from flexural attenuation. The different distance from the emitter 68 and the two receiver transducers 70 and the energy leak induce different amplitudes on the measured acoustic pressure.

Figure 3:
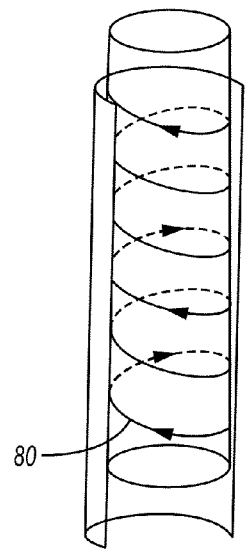
FIG. 3 is geometrical interpretation of a helical propagation path of an acoustic signal in accordance with an embodiment of the disclosure.
Figure 4:
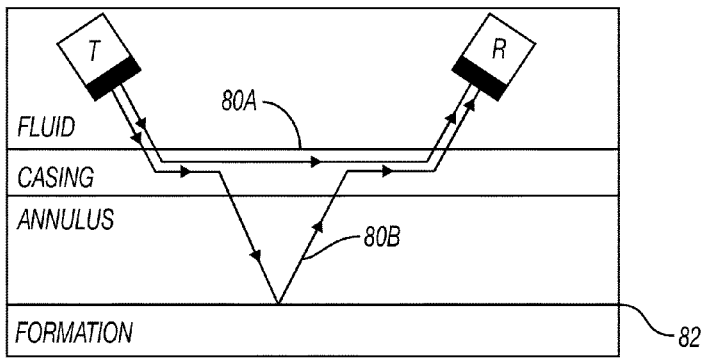
FIG. 4 is a geometrical interpretation of a propagation path of an acoustic signal in accordance with an embodiment of the disclosure.

FIGS. 3 and 4 shows geometrical interpretations of the propagation path of a signal 80 acquired with one of the two receivers 70. The signal may represent all or a portion of the acoustic waves emitted from the emitter 68 through and/or reflected by the casing wall 22, annulus 18, and/or formation 14 and received and one or more receivers 70 (e.g., all or a portion of acoustic waves 72, 74, 76, 78). In FIG. 3, the signal 80 is represented as a function of time and depth along the helical path along the direction of the rotation of the tool. In FIG. 4, the signal 80 is shows the propagation path of two events of the signal 80. The early event, represented as signal 80A, is the casing arrival due to propagation of the flexural mode. The later-arriving event, represented as signal 80B, may include a reflection from an interface 82 between the cement 18 and the formation 14.

Figure 5:
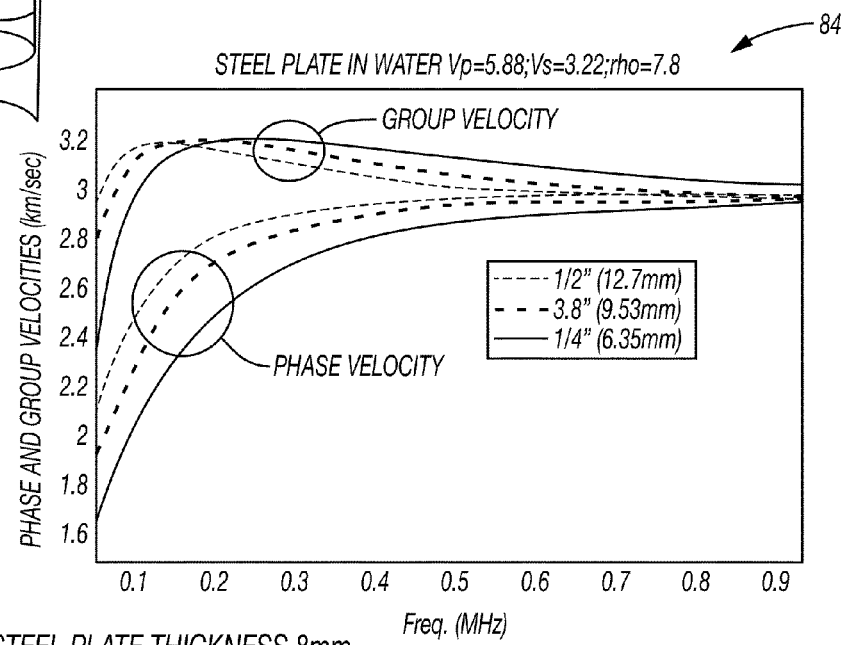
FIG. 5 is a plot of phase velocity for various casing thicknesses in accordance with an embodiment of the disclosure.
Figure 6:
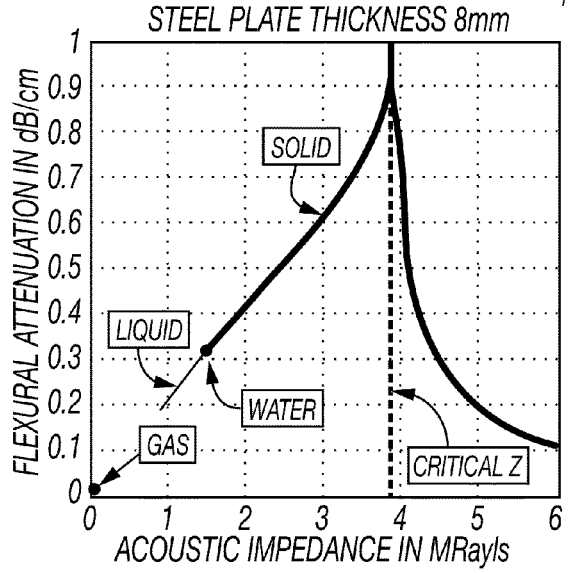
FIG. 6 is a plot of an acoustic impedance of an annular fill with respect to flexural attenuation in accordance with an embodiment of the disclosure.

The casing arrival 80A may have a velocity that is substantially dispersive and dependent on the frequency of the emitted acoustic signal. FIG. 5 is a graph 84 of the phase velocity of the casing arrival 80A for various steel casing thicknesses. In accordance with the present techniques, the casing arrivals 80A from the near and far receivers 70 are processed to estimate an attenuation measure. In some embodiments, the amplitude of the associated analytical signals is computed (e.g., by taking a Hilbert transform for each signal) and the ratio of the envelope peaks is determined. The ratio of the envelope peaks, referred to as ATT and expressed in dB/cm or dB/m, is plotted in the graph 86 of FIG. 6 as a function of acoustic impedance of the annular fill. The peak 88 in the graph 86, at around 4 MRayls, is associated with a transition regime whereby the flexural mode does not radiate a compressional bulk wave in an annulus 18. Above 4 MRayls and beyond the peak 88, only the shear bulk wave is radiated into the annular space 18, thereby yielding a lower level of attenuation. While the attenuation measure of the flexural mode is represented as a single number, the flexural mode attenuation is dispersive, as the particle motion associated with the mode propagation in the steel layer changes in amplitude and direction with frequency.

Figure 7:
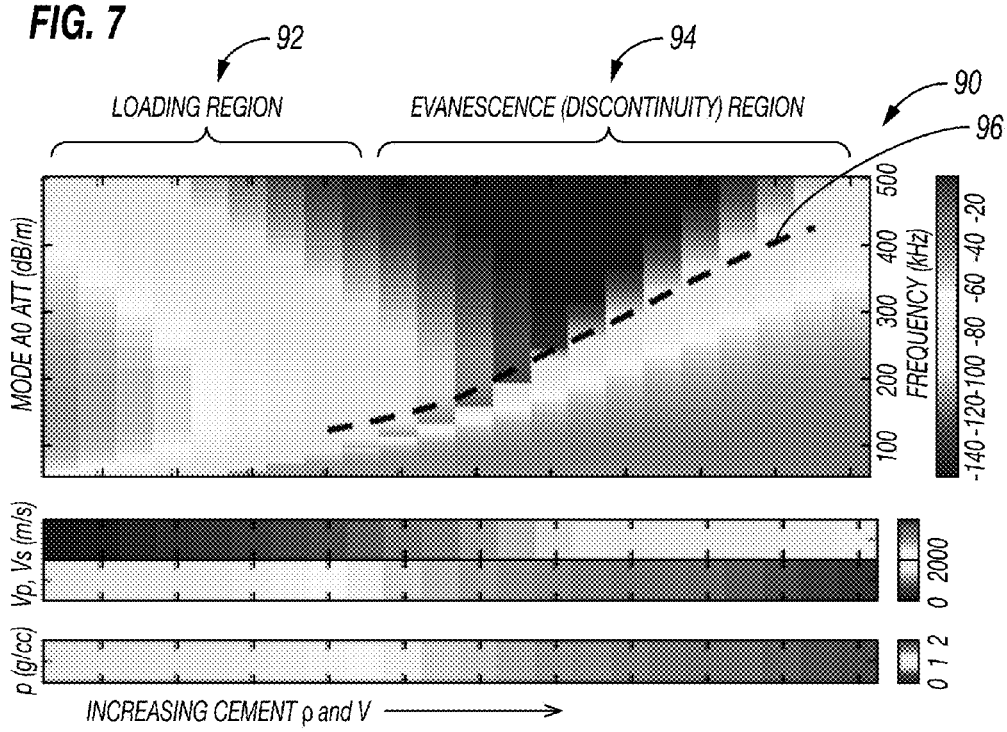
FIG. 7 is a graph representing flexural mode attenuation dispersion for a water-steel-cement configuration in accordance with an embodiment of the present disclosure.

FIG. 7 is a graph 90 representing flexural mode attenuation dispersion for a water-steel-cement configuration (assuming a well-bonded steel-cement case), as a function of increasing cement wavespeed and density. The cement P wavespeed (Vp) increases from a value of 1500 m/s with zero shear, and thus simulating water, to a value of 3500 m/s. The corresponding variation in shear wavespeed (Vs) is 0 to 2200 m/s. The frequency varies from 50 to 500 KHz, while the color-scale for the attenuation varies from –10 to –150 dB/m.

The attenuation is shown to vary significantly for certain cement wavespeeds and as a function of frequency. The graph 90 distinguishes two regions, where a first region 92 having low wavespeed values (Vp) the attenuation increases smoothly from –60 to –100 dB/m accompanied by a smooth change along the frequency axis. The corresponding signal received, at the far receiver 70 for instance, will be expected to have a reduced bandwidth in the high-frequency range as Vp increases in this low range (up to roughly 2200-2300 m/s). A second region 94 having relatively higher wavespeed values (Vp) and especially for 2500 m/s to 3200 m/s, the dispersion experiences a strong discontinuity as indicated by the dashed curvilinear line 96. Across this line 96, the attenuation is very low at low frequencies and very high at higher frequencies.

The discontinuity of the attenuation dispersions is related to the phenomenon of evanescence and propagation in the cement layer 18 as a function of its acoustic properties. At any given frequency, the flexural mode radiates wave energy (P) into the cement layer if the flexural mode phase velocity at that frequency is higher than the cement bulk wavespeed Vp. If this is not the case, then no radiation of a P bulk wave occurs: the P wave evanesces and remains at the steel-cement interface. Since the flexural mode phase velocity changes with frequency, its relation to the cement wavespeed changes with frequency, especially in the case where the cement wavespeed crosses the flexural phase velocity dispersion curve.

Figure 8:
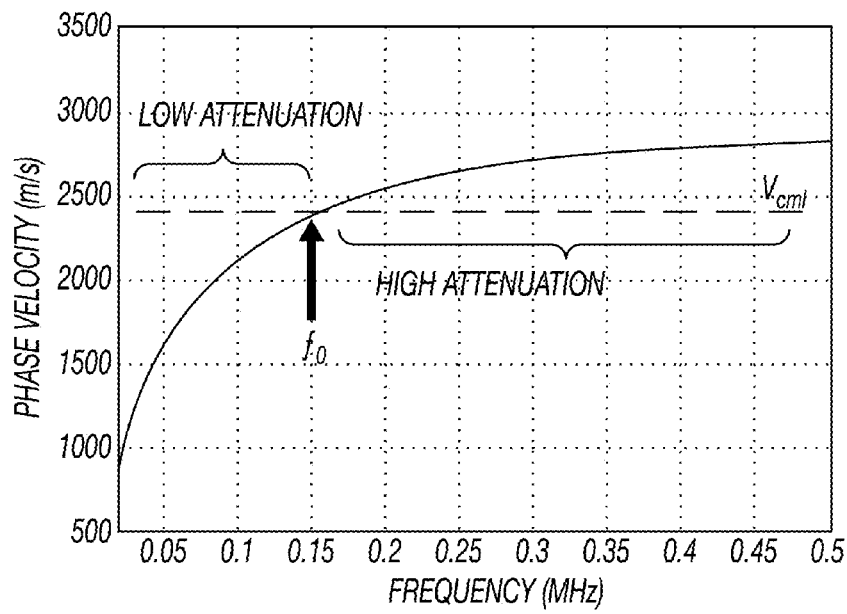
FIG. 8 is a graph of the phase velocity of the flexural mode propagating in casing immersed in water in accordance with an embodiment of the present disclosure.

FIG. 8 is a plot 98 of the phase velocity of the flexural mode propagating in a ⅜"-thick steel casing immersed in water. A cement bulk compressional or shear wave velocity (Vcmt) intersects the flexural mode dispersion at frequency $f_0$. Given the discussion above, there is radiation of the bulk wave corresponding to Vcmt (either P or S) into the cement layer for $f > f_0$. In this range, the flexural mode phase velocity is larger than Vcmt. The flexural mode may therefore have a low attenuation below $f_0$ and a high attenuation above it $f_0$.

As discussed above, in accordance with embodiments of the present techniques, knowledge of the frequencies corresponding to the discontinuity in the flexural mode attenuation dispersion can be used in conjunction with its phase velocity dispersion to mark the value of the cement wavespeed Vp responsible for the discontinuity. Further, in some embodiments, if no discontinuity can be identified on the attenuation dispersion, an inversion scheme may be used to match the estimated dispersions to calculated dispersions. In accordance with embodiments of the present techniques, different workflows may be suitable depending on whether discontinuities are present in the attenuation dispersion.

Figure 9:
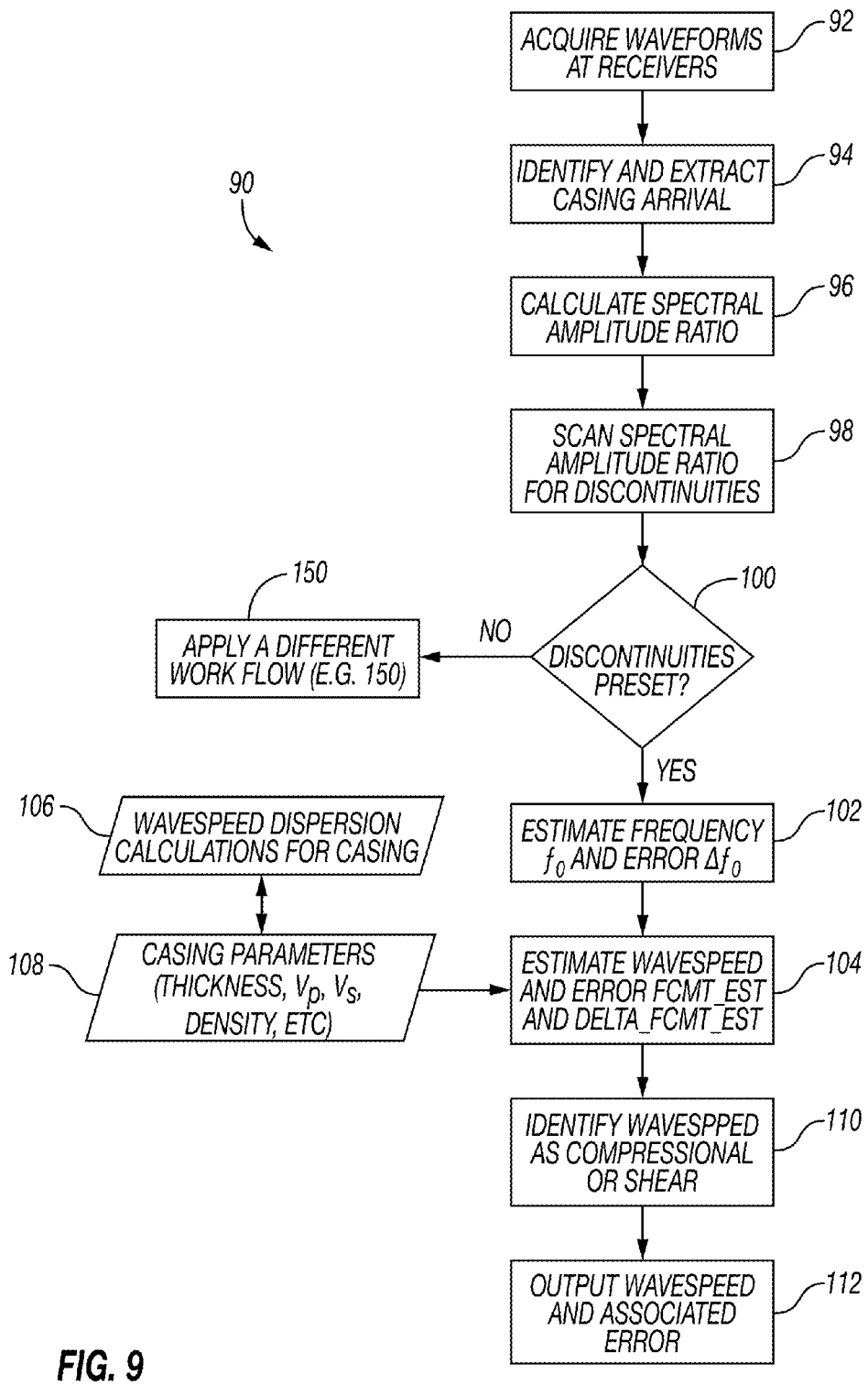
FIG. 9 is a workflow for determining the cement wavespeed in accordance with an embodiment of the present disclosure.

FIG. 9 is a flow chart 90 summarizing a workflow for determining the cement wavespeed Vp. In some embodiments, a workflow 90 for determining the cement wavespeed Vp may involve acquiring (block 92) the ultrasonic waveforms 74, 76, 78 at the receivers 70. The waveforms may include near and far waveforms (e.g., from both near and far receivers 70). The acquired waveforms 74, 76, 78 may then be processed to identify and extract (block 94) the casing arrival 80A. In some embodiments, the casing arrivals 80A may be identified using, for example, an envelope detector. Kalman tracking of the tool position over multiple acquisitions can be used to obtain a more robust location of the casing arrivals 80A.

The attenuation dispersion may then be calculated (block 96) from the casing arrivals 80A acquired at the receivers 70. Embodiments of the present techniques may be applicable to various techniques for determining attenuation dispersion. In some embodiments, one type of attenuation dispersion which may be calculated is a spectral amplitude ratio. Equation (1) below is an example of a relationship which may be used to calculate the spectral amplitude ratio:

$$ATT(f) = 20 * \log 10(abs(\text{FFT}(\text{CasingArrival\_FAR}))/abs(\text{FFT}(\text{CasingArrival\_NEAR}))) * 10 \qquad \text{Eq. (1)}$$

where CasingArrival_FAR and CasingArrival_NEAR are the extracted portions of signal 80A and FFT refers to the fast Fourier transform that calculates the Fourier transform of a time-domain waveform. In some embodiments, other equations or rearrangements of Eq. (1) may be used. For example, Eq. (1) multiplies the ratio by 10, as the distance between the two receivers is 100 mm, thereby resulting in an expression of the ratio having units of dB/m.

Figure 10:
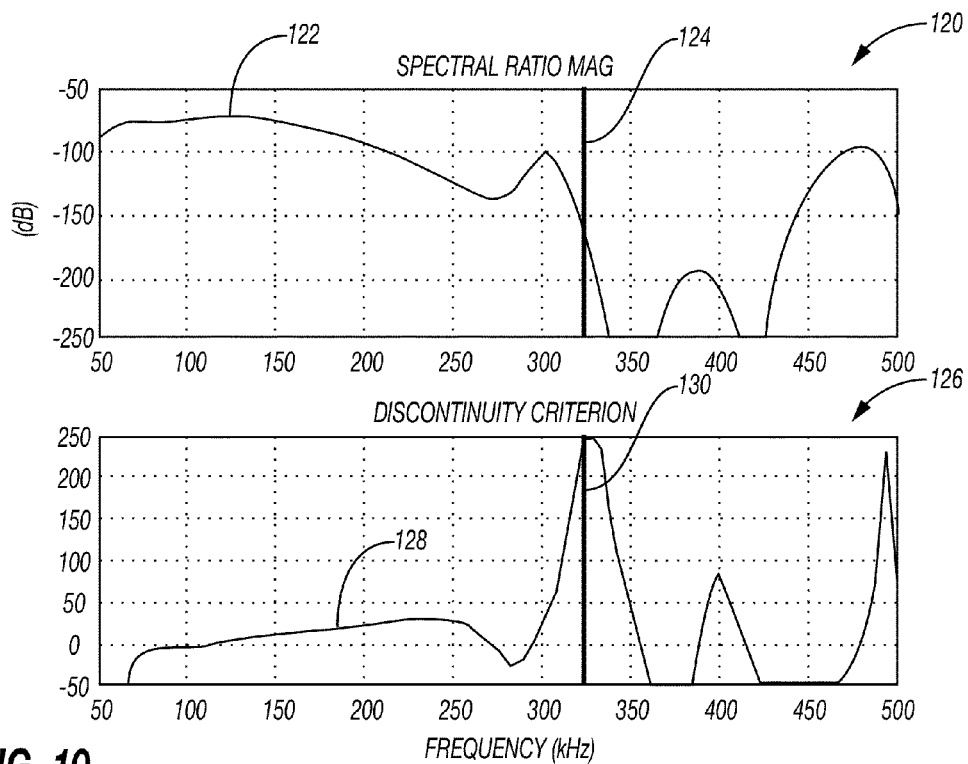
FIG. 10 are two plots illustrating how spectral amplitude ratio may be scanned for the discontinuities in accordance with an embodiment of the present disclosure.

The workflow 90 may involve scanning (block 98) the spectral amplitude ratio for the presence of discontinuities with respect to frequency. If (block 100) a discontinuity is detected, the frequency f0 and the associated error Delta_f0 may be estimated (block 102). As the spectral amplitude ratio is computed from two time compact arrivals, and the jump at the discontinuities may be smeared over frequency. In some embodiments, such discontinuities may be detected and located in a test range of frequencies using suitable discontinuity criterion. For example, FIG. 10 are plots 120 and 126 illustrating how a spectral amplitude ratio 122 may be scanned or evaluated for the presence of discontinuities with respect to frequency. As represented in plot 120, in some embodiments, the amplitude ratio 122 may be evaluated to determine whether a decrease beyond a threshold 124 or a reference value computed at the low frequency range. The first frequency (e.g., at approximately 325 Hz in the example plot 120) at which the amplitude ratio 122 is beyond this threshold 124 may be the frequency of the discontinuity. Furthermore, as represented in plot 126, discontinuities may be detected by testing for the gradient 128 of the amplitude ratio exceeding a value within the test frequency range. The composite criterion is compared to a threshold for all frequency values in the test range and if greater, a discontinuity is detected and the lowest frequency peak 130 (e.g., at approximately 325 Hz in the example plot 126) of the criterion is output as the discontinuity location to be used for further processing as will be described in the workflow below. In some embodiments, alternative workflows may be applicable depending on whether a discontinuity is detected. For example, in some embodiments, a hypothesis-based estimation or other known signal processing schemes may be suitable.

Figure 11:
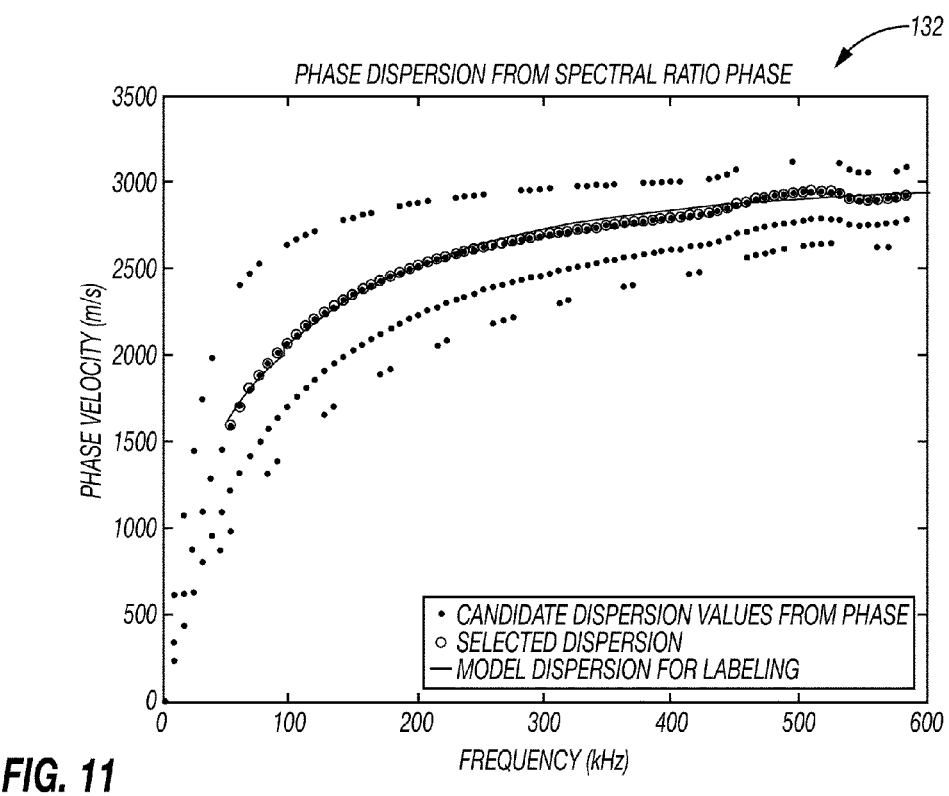
FIG. 11 is a plot of the phase velocity of the flexural mode extracted from the phase of the spectral ratio in accordance with an embodiment of the present disclosure.

In some embodiments, the spectral amplitude ratio may also be used to determine a phase difference according to Equation (2) below:

$$\phi(f) = \angle(\text{FFT}(\text{CasingArrival\_FAR})/\text{FFT}(\text{CasingArrival\_NEAR})) \quad \text{Eq. (2)}$$

where $\phi(f)$ represents a phase difference related to flexural mode phase velocity dispersion. The phase difference can be related to the flexural mode phase velocity dispersion using Equation (3) below:

$$v(f) = \frac{\Delta z}{t_0 - \frac{\phi(f) + 2n\pi}{2\pi f}} \quad \text{Eq. (3)}$$

where $\Delta z$ is the inter-receiver spacing, $t_0$ is a time shift applied before computing the spectral ratio, and $2n\pi$ is the phase ambiguity for any integer n. The integer n is due to the wavelength being much shorter than the inter-receiver spacing. Moreover, the aliases of $v(f)$ are close together and the correct $v(f)$ may not be easily obtainable from among its aliases. However if the casing is sufficiently well characterized, the model dispersion curve may be used to find the value of n leading to the $v(f)$ closest to the model dispersion values. This data-driven correction to the model phase dispersion may then be to be used to disambiguate the aliasing and extract the empirical phase dispersion velocity to be used to identify the cement wavespeed. However the dispersion thus obtained with two receivers may be subject to errors and may be quality controlled before use. This approach may be represented by the plot 132 of FIG. 11, which plots the phase velocity of the flexural mode extracted from the phase of the spectral ratio and disambiguated with the use of a modeled dispersion curve generated with a mode search algorithm for the Lamb wave.

The workflow 90 may then involve estimating (block 104) the flexural phase velocity value, fcmt_est (the wavespeed) and its error, Delta_fmt_est, corresponding to f0 and Delta_f0. In some embodiments, calculation of the phase velocity dispersion for the flexural mode of the casing may be conducted pre-logging and stored in tables of dispersions. To perform this calculation, casing parameters (block 108) such as the casing thickness, the casing compressional and shear wavespeeds, and the casing density may be used. To a first-order approximation, parameters of the logging fluid and medium in the annulus (cement or otherwise) do not significantly influence the phase velocity dispersion curves. In some embodiments, approximate values for the parameters may be used from the manufacturer's specifications of the casing, without yielding too erroneous or non-useable dispersions curves. For a casing thickness measurement with greater accuracy, a pulse-echo measurement may be taken implemented (e.g., from the pulse-echo measurement of the same ultrasonic tool).

In some embodiments, the phase velocity dispersions may be estimated in real time using a mode search algorithm. An acceptable approximation can be made in assuming a steel plate in fluid, assuming the phase velocity dispersions are not significantly perturbed by the cylindrical geometry of the casing and/or having the casing cemented. Alternatively, the phase velocity dispersions (block 106) may be extracted from a priori computed tables of dispersions according to the casing parameters mentioned above. Moreover, a data driven extraction of the phase dispersion using a nominal model dispersion can also be performed.

The phase velocity value fcmt_est with its uncertainty Delta_fcmt_est correspond to the cement bulk wavespeed responsible for the existence of the discontinuity in the attenuation dispersion. In some embodiments, the wavespeed may be evaluated to identify (block 110) the estimated cement wavespeed as compressional or shear wavespeed. Typically, surface measurements of the cement are generally compressional, and sometimes shear. These measurements can be used to ascribe the inverted cement wavespeed to the compressional or shear waves. Furthermore, values higher than approximately 2500 m/s pertain to Vp and that below approximately 2100 m/s, to Vs. The workflow 90 may then output (block 112) the wavespeed and associated error.

Figure 12:
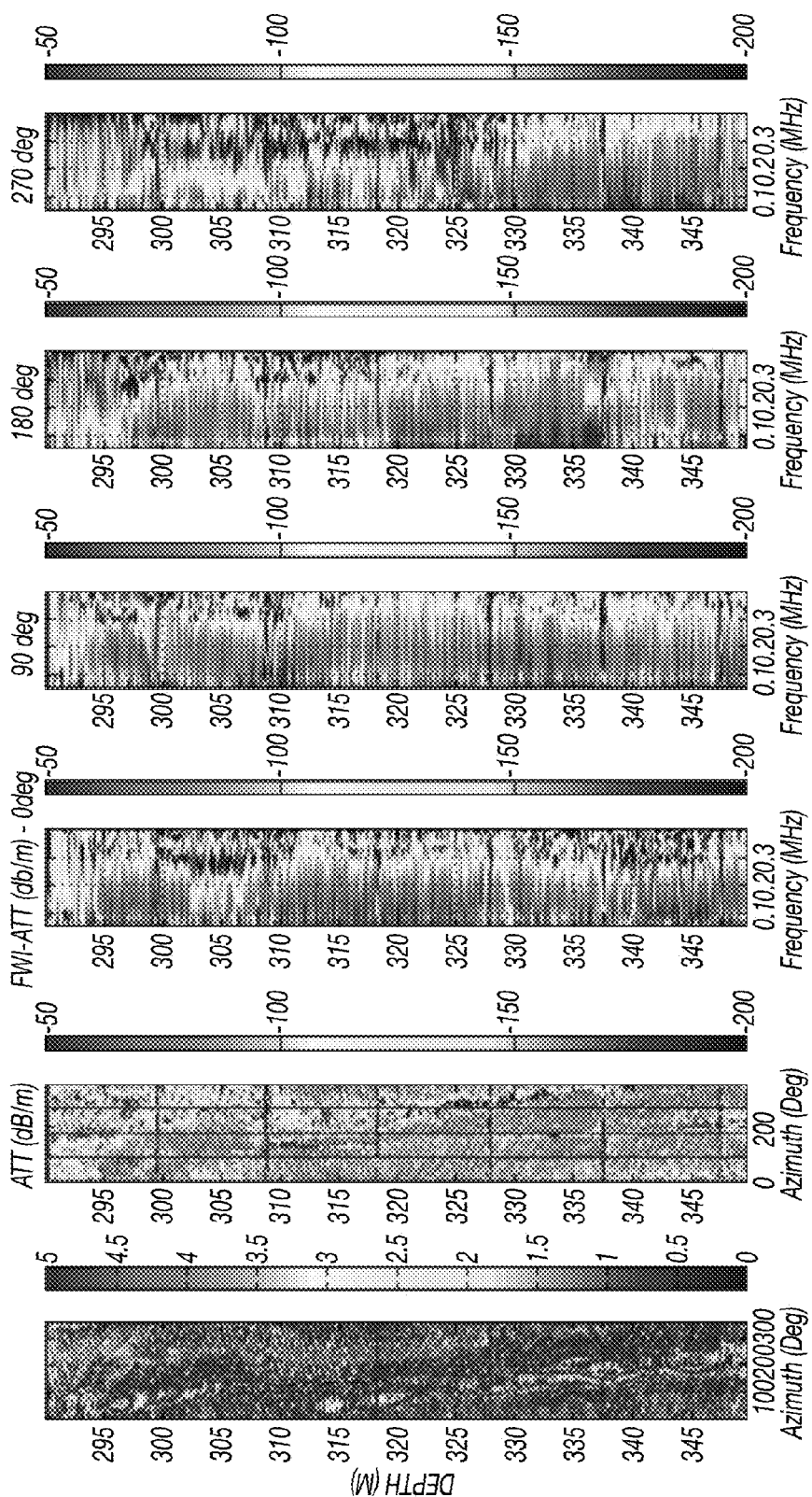
FIG. 12 illustrates panels illustrating the application of the workflow for determining wavespeed in accordance with an embodiment of the present disclosure.

An image representing an application of the workflow 90 to data is provided in FIG. 12. FIG. 12 shows several panels comparing several attributes. The leftmost panel 134 displays the pulse-echo acoustic impedance which results from processing the pulse-echo measurement from an ultrasonic tool. Panel 136 displays ATT, the flexural mode attenuation estimated from the ratio of the envelope peaks (without consideration for the dispersion). In this panel and that of the acoustic impedance 134, the material properties distinguishably change azimuthally in the region 360 to 290 m. The acoustic impedance 134 exhibits the effects of galaxy patterns known to arise when the reflection echo from the cement-formation interface perturbs the processing of the resonant signal (which is the basis of the acoustic impedance inversion). Panels 138, 140, 142, and 144 show the attenuation dispersions at four azimuthal planes: 0 (panel 138), 90 (panel 140), 180 (panel 142), and 270 (panel 144) degrees. The attenuation has significant variations as a function of frequency and across azimuths and depth. Variations occur relatively abruptly and hence can be referred to as a discontinuity. This discontinuity is tracked for all 36 azimuths and across depth using the amplitude ratio difference.

Figure 13:
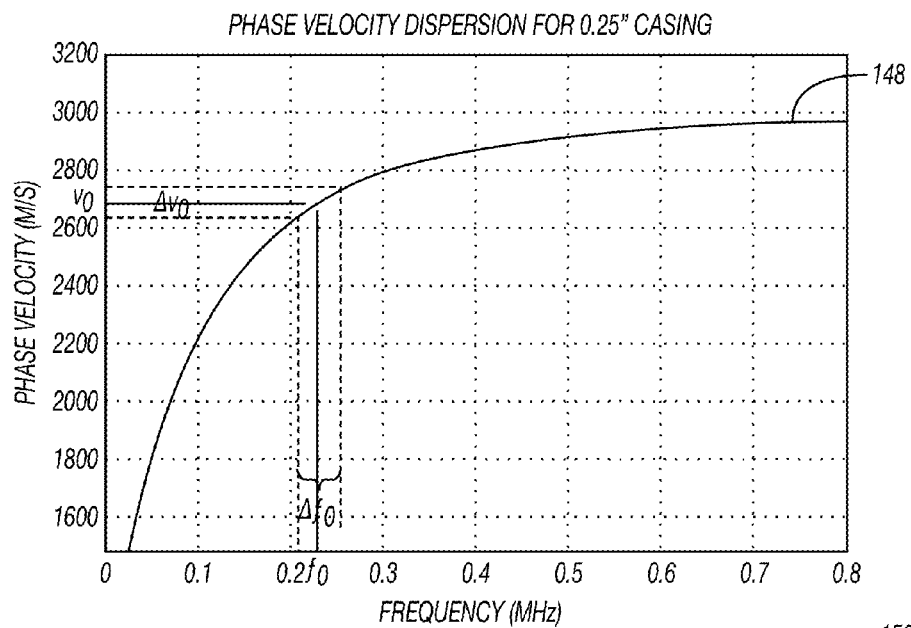
FIG. 13 is a graph of the phase velocity dispersion in accordance with an embodiment of the present disclosure.

The casing thickness as estimated from the pulse-echo measurement has a value close to 0.25 inches or 6.35 mm. Using nominal values for steel density and P and S wavespeeds, the phase velocity of the flexural mode can be calculated using a standard mode search algorithm for the Lamb wave problem. As further represented in the plot 146 of FIG. 13, the uncertainty Delta_v0 may in the wavespeed estimate V_0 may be dependent on the uncertainty Delta_f0 in the discontinuity estimate f0 as shown by the dispersion curve 148. The data may then be used in conjunction with the discontinuity frequencies to estimate the corresponding cement wavespeeds.

Figure 14:
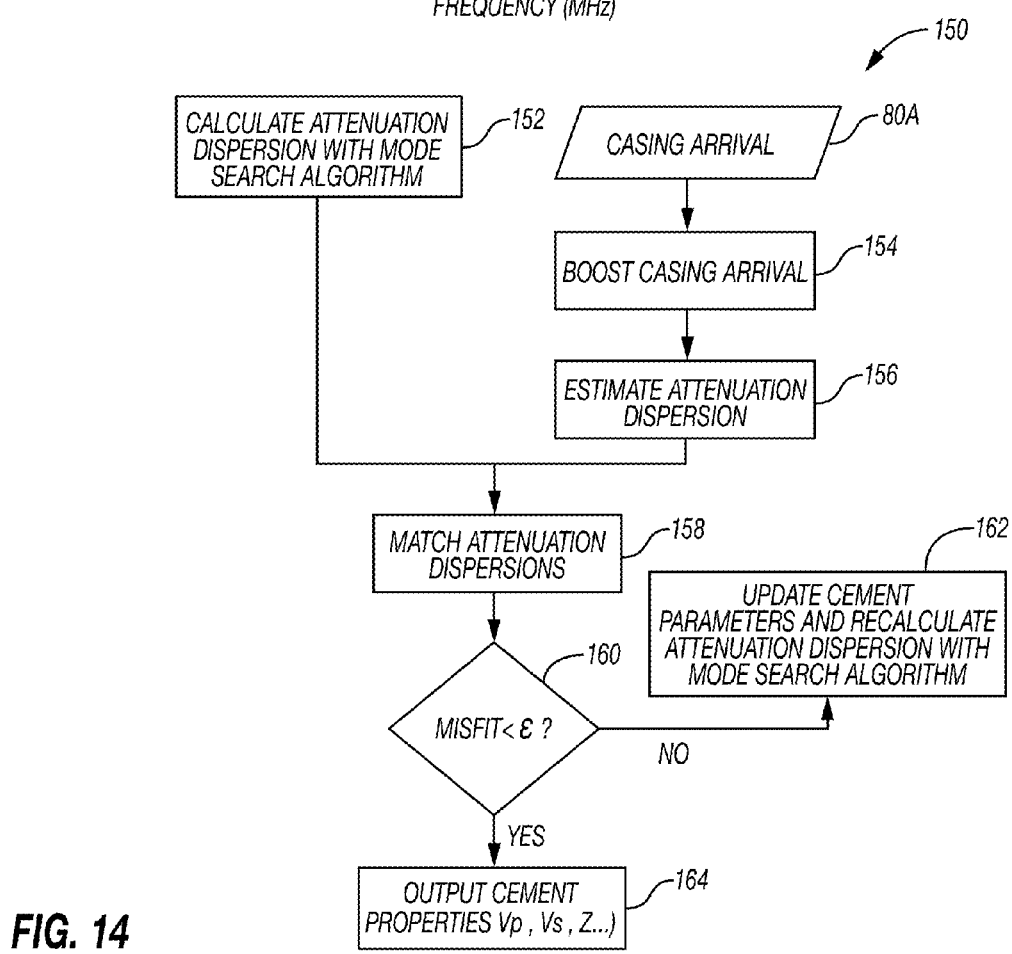
FIG. 14 is a workflow for determining the cement wavespeed in accordance with an embodiment of the present disclosure.

As discussed above, in accordance with embodiments of the present techniques, different workflows may be suitable depending on whether discontinuities are present in the attenuation dispersion. FIG. 9 illustrated a workflow 90 suitable for when discontinuities are present in the attenuation dispersion. FIG. 14 illustrates a workflow 150 for some embodiments suitable for when no discontinuity can be identified on the attenuation dispersion.

When the discontinuity is not present in the data (e.g., when the cement wavespeed does not cross the flexural mode phase velocity curve), an inversion approach may be used to match the estimated attenuation dispersion curve with a calculated attenuation dispersion curve. The calculated dispersion is generated (block 152) with a mode search algorithm for the Lamb wave problem for a steel plate surrounded by a fluid or cemented on one side. In this eigenvalue approach, the dispersion equation expressed in terms of global reflection and transmission coefficients for a fluid-immersed layered elastic structure, is formulated using the reverberation matrix approach widely described in the literature. It can be written as equation (4) below:

$$D(k,\omega,x)=0 \qquad \text{Eq. (4)}$$

where x is the vector that contains the material and geometry parameters of the layered configuration model, k is the propagation wavenumber along the plane of the plate, and $\omega=2\pi f$ is the angular frequency.

When the parameter vector x is given in the model, solutions to the above equation yield complex roots in the k–ω plane, written as (ω, x). The imaginary part of k corresponds to the attenuation of the flexural mode and is associated with radiation into the plate surrounding media. Its dependence on ω provides the attenuation dispersion we are concerned with here. Numerically, the equation above D=0 can be implemented using a complex Newton-Raphson method. However, the mode search approach does not consider the effects of the transmitting and receiving transducers in the measurement, since the Lamb-wave problem solved is source- and receiver-free eigenvalue problem.

In some embodiments, a compensation scheme may be applied for the measured transducer-beam established dispersions. In using a ratio of measured signal amplitude between two nearby receivers, several parameters that control the signal amplitude may be canceled from consideration, such as radiation by the transmitter, reception by the receivers (assumed identical in characteristics), and acoustic coupling into and out of the steel plate. For the propagation inside the steel plate, the modal structure of the mode may be accounted for by mode search in so far as the plate boundaries and elastic properties are concerned. However, beam spreading in the lateral (azimuthal) direction that accompanies the real transducer-beam propagation from transmitter to receiver and via a path in the steel casing along the axial direction, is not accounted for in the mode search approach.

To use the mode search calculations in the inversion, lateral beam spreading may be compensated for either in the measured attenuation dispersion or the mode-search generated dispersions. In some embodiments, the beam spreading may be compensated for in the measured attenuation dispersion, by "boosting" the measured signal attenuation. Analytical modeling followed by high-frequency asymptotic analysis of the ultrasonic pitch-catch measurement with transducers aligned both at angle α with respect to the normal to the casing, shows that the frequency-dependent lateral spreading of a measured beam signal S(ω) at a receiver located at distance TR from the transmitter can be expressed according to Equation (5) below:

$$S(\omega) \propto \left| TR^2 + \frac{\omega^2 W_0^4 \sin^2(\alpha)}{v_f^2} \right|^{-\frac{1}{4}} \qquad \text{Eq. (5)}$$

where $v_f$ is the logging fluid wavespeed, $W_0$ is a measure related to the receiver and transmitter aperture (in case where the complex-transducer-point (CTP) technique is used to model the transducer beams, $W_0$ refers to the 1/e-width of the CTP transducer—assumed identical for the transmitter and receivers).

The measured signals S(ω), or calculated signals with a waveform-simulator, may then be compensated for the lateral spreading. This may be performed by boosting (block 154) the signal at each receiver with a frequency-dependent term, according to Equation (6) below:

$$Q(\omega) = S(\omega) \left| TR^2 + \frac{\omega^2 W_0^4 \sin^2(\alpha)}{v_f^2} \right|^{+\frac{1}{4}} \qquad \text{Eq. (6)}$$

where Q(ω) denotes the boosted signal at a receiver located at TR in the frequency domain.

The attenuation dispersion may then be estimated through the spectral amplitude ratio of the two waveforms. For example, the attenuation estimation formula used with workflow 90 may be adapted as according to Equation (7) below and used to estimate (block 156) attenuation dispersions in workflow 150:

$$ATT(f)=20*\log 10(abs(FFT(CasingArrival\_FAR))/abs(FFT(CasingArrival\_NEAR)))*10 \qquad \text{Eq. (7)}$$

where the CasingArrival_FAR and CasingArrival_NEAR are now boosted in the frequency domain as per the equation for Q(ω) above, with the parameter TR (transmitter to receiver spacing) assigned the appropriate values for CasingArrival_NEAR and CasingArrival_FAR, respectively. For instance, for Schlumberger's Isolation Scanner, transmitter to receiver spacings for the near and far receivers are 250 mm and 350 mm, respectively.

Referring to the above-mentioned inversion approach that may be based on matching the estimated attenuation dispersion curve with a calculated attenuation dispersion curve, the workflow 150 in FIG. 14, may determine whether the calculated (block 152) and estimated (block 156) attenuation dispersions match (e.g., whether any misfit is below a certain threshold or variance). If not, the cement parameters may be updated and the dispersion recalculated (block 162) and then the recalculated and estimated dispersions are compared (block 158). Once the attenuation dispersions sufficiently match, the set of cement properties (e.g., Vp, Vs, and/or Z) used on the last iteration may be output (block 164).

Figure 15:
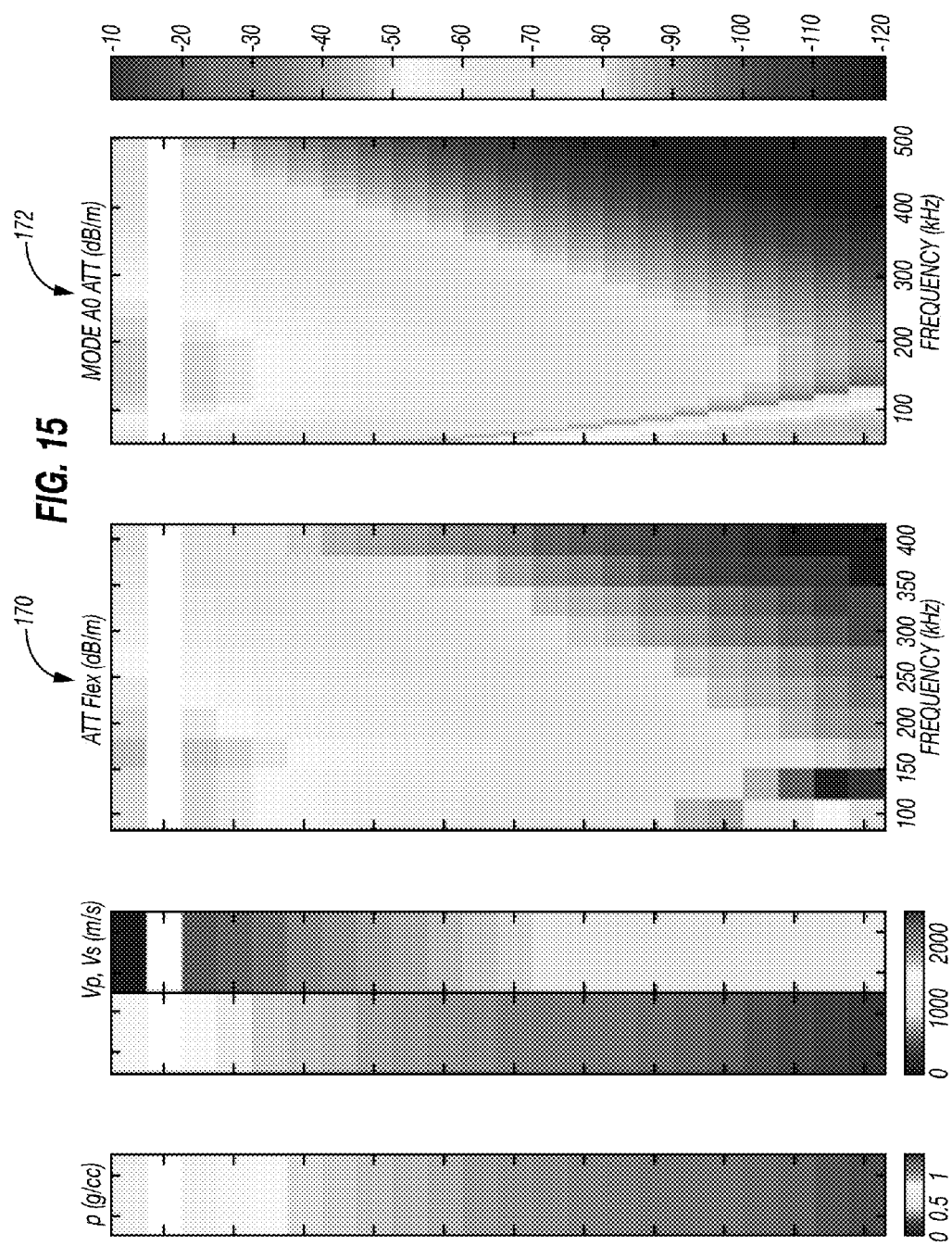
FIG. 15 are graphs showing the attenuation dispersion as calculated and as estimated in accordance with an embodiment of the present disclosure.

To illustrate that measured and calculated dispersions can indeed match, we contrast the two dispersions for a wide range of cement velocities but where the measurement is simulated using a simulation code for the flexural wave pitch-catch measurement. FIG. 15 shows images of the attenuation dispersion of the flexural mode as calculated with a mode search algorithm (graph 172) and the attenuation dispersion as estimated from waveforms generated with a simulation code for the flexural wave pitch-catch measurement and amplitude-compensated for the lateral beam spreading as per the above scheme (graph 170). The two graphs show relatively high similarity between the two attenuation images. The cement compressional wavespeed, shear wavespeed, and density are varied along the vertical axis. Vp varies from 1800 to 2500 m/s. A case for water with Vp=1500 m/s is also shown as the top most slice which is separated from the rest of the image.

Figure 16:
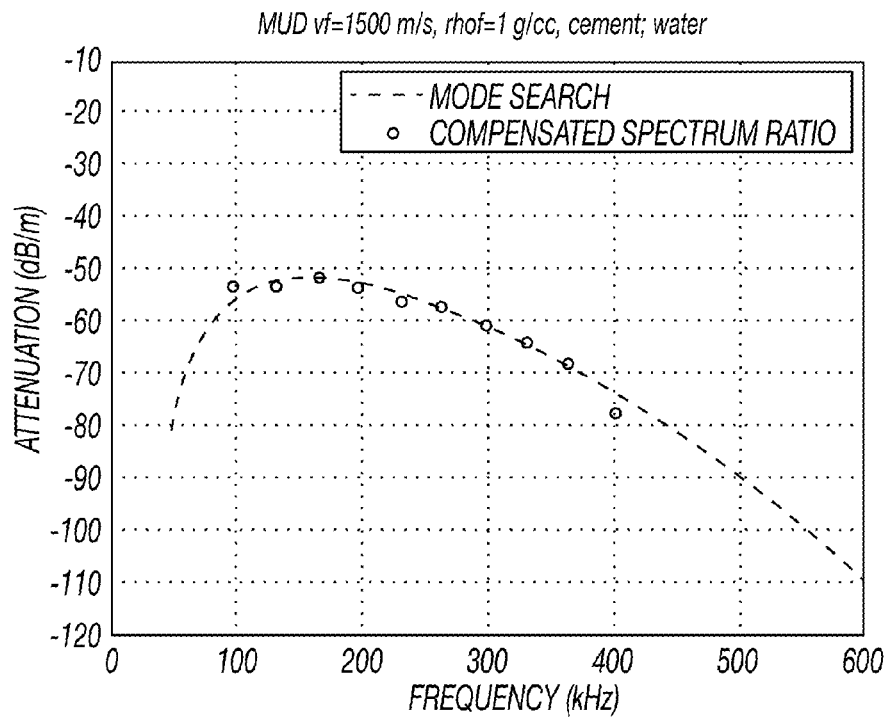
FIGS. 16 and 17 are plots showing water-filled annulus and cement filled annulus, respectively, in accordance with an embodiment of the present disclosure.

To illustrate the contrast more quantitatively, line plot comparisons for water and cement with Vp around 2200 m/s are shown in FIGS. 16-19. FIG. 16 pertains to a water-filled annulus while FIG. 17 pertains to a cement-filled annulus with water as logging fluid. Both figures show a relatively strong match of the mode-search results (dashed lines) and amplitude-compensated simulated measurement data (dots) indicating the scheme is valid for inversion of cement properties (which can include wavespeeds and/or a measure of the impedance of the cement).

Figure 17:
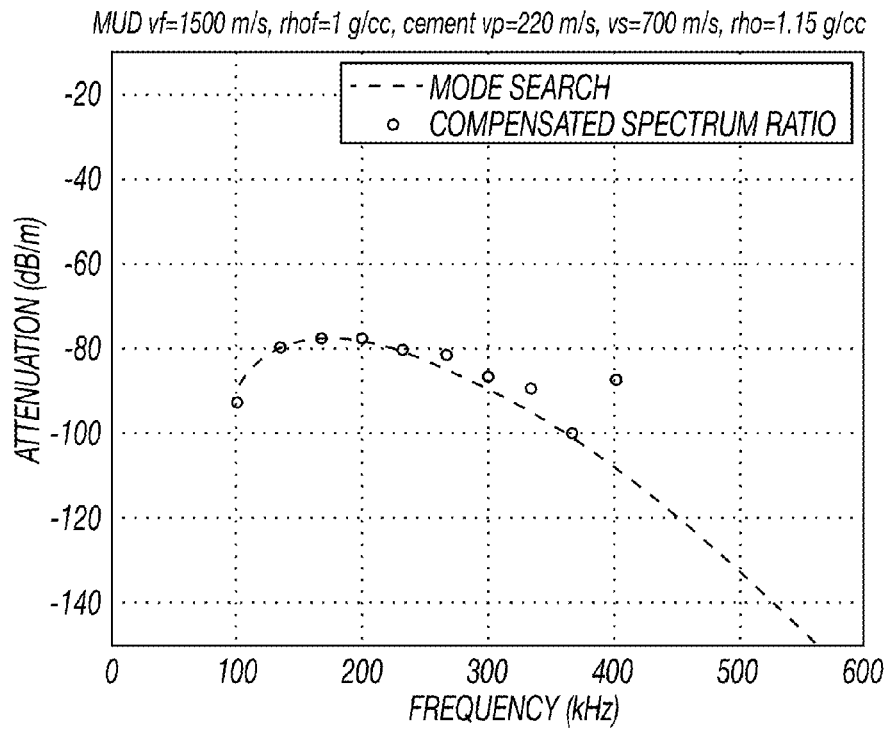
Figure 18:
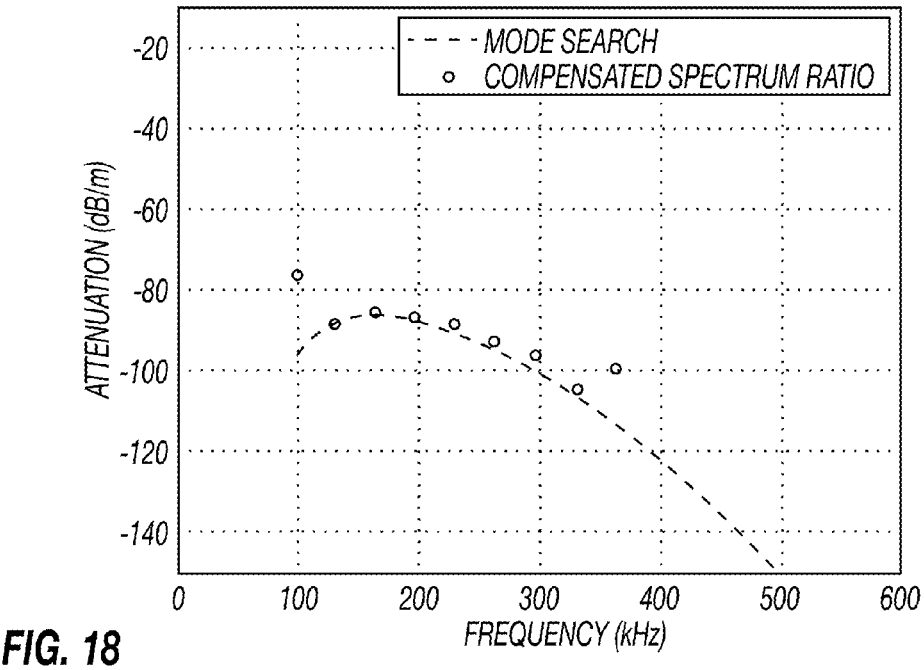
FIGS. 18 and 19 are plots showing heavy logging fluid and light logging fluid, respectively, in accordance with an embodiment of the present disclosure.
Figure 19:
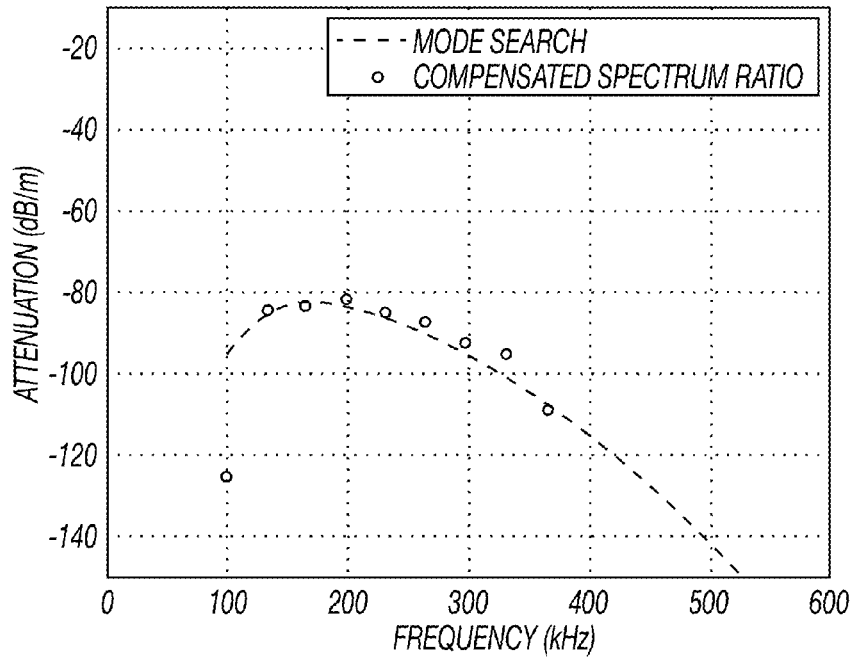

FIGS. 18 and 19 show results for the same cement as in FIG. 17 but with different acoustic properties for the logging fluid. In FIG. 18, the logging fluid is heavy (with density 1.8 g/cc) and a low wavespeed (1200 m/s), simulating heavy mud. In FIG. 19, the logging fluid is light with a higher wavespeed than water. The matching remains satisfactory for these different conditions. Further, the effects of changing the logging fluid wavespeed and density on the attenuation dispersions are minimal. This indicates that the inversion scheme described herein is robust to error in logging fluid property determination Embodiments of the present techniques may be applied to ultrasonic waveform data to provide information related to the annular fill acoustic properties, including, for example, the cement wavespeed. The characterization of the cement properties may be useful in various applications. For example, the estimated cement wavespeed provides substantially unambiguous indication of a solid in the annulus. The value of the wavespeed and its variation is a strong indicator of whether the annular fill is solid or liquid. Moreover, the estimated cement wavespeed provides a quantitative assessment on the mechanical integrity of the cement sheath. Mechanical models may be used to evaluate the strength and predict the future mechanical behavior of the cement barrier.

In some embodiments, the estimated cement wavespeed provides the means to invert for the cement annular thickness. Such inversion techniques may be performed in conjunction with processing of the third-interface echo (or reflection echo from the cement-formation interface—such a third-interface echo may arise in signals acquired with the flexural mode imaging technique implemented for example in Schlumberger's Isolation Scanner). Such inversion techniques may yield the echo travel time in the cement sheath. Therefore, ambiguities between cement caliper and wavespeed variation may be substantially reduced, and assumptions on the borehole diameter may no longer be used (as is the case currently in the inversion of the third-interface echo transit time for cement wavespeed). Inversion techniques also may improve the accuracy of the estimation of the casing eccentering.

In some embodiments, the wavespeed estimated from time-lapse measurements with the techniques described herein provides the time evolution of the mechanical integrity of the cement sheath and indicates critical changes such as impending or future mechanical failure. With the embodiment described herein, cement wavespeed estimated from data acquired from a Logging-While-Drilling tool may provide the time evolution of the mechanical integrity of the cement sheath during the curing as the measurement may be taken repeatedly across the cased cemented upper zones, when the drilling string is moved across them during tripping. The inverted values may indicate whether there is full mechanical integrity and zonal isolation of the cement sheath. Furthermore, knowledge of the cement or annular wavespeeds provide valuable data to support the forward modeling and interpretation of sonic measurements taken in cased hole logging in the same interval. For example, such inversion and interpretation techniques may yield more quantitative inversions of the near-wellbore characterization such as monopole, dipole, and Stoneley slowness radial profiling.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way used for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense and not for purposes of limitation.

The claimed invention includes:

1. A method for estimating an acoustic property of an annulus in a cement evaluation system, the method comprising:

acquiring, at a plurality of acoustic receivers in the cement evaluation system, acoustic waveforms that have propagated through a casing of the cement evaluation system, the annulus, or both;

extracting, from the acoustic waveforms, a casing arrival signal comprising portions of the acoustic waveforms that have propagated through the casing, wherein the casing arrival signal substantially excludes portions of the acoustic waveforms arising from reflections from the annulus or reflections at an interface of the annulus and a formation surrounding the annulus;
calculating an attenuation dispersion, of the casing arrival signal based on portions of the casing arrival signal received at each receiver of the plurality of acoustic receivers, wherein the attenuation dispersion represents attenuation as a function of the frequency;
detecting a discontinuity in the attenuation dispersion;
when a discontinuity is detected, estimating a frequency at the detected discontinuity;
when a discontinuity is detected, calculating a phase velocity dispersion of the casing arrival signal; and
when the discontinuity is detected, estimating a wavespeed of the annulus based on the estimated frequency and the estimated phase velocity dispersions.

2. The method of claim 1, wherein the plurality of acoustic receivers comprises a first receiver and a second receiver, and wherein calculating the attenuation dispersion comprises calculating a spectral amplitude ratio of the casing arrivals is based on a spectral amplitude equation:

$$ATT(f)=20*\log 10(abs(FFT(CasingArrival\_FAR))/abs(FFT(CasingArrival\_NEAR)))$$

where CasingArrival_NEAR comprises a first portion of the casing arrival signal received at the first receiver, CasingArrival_FAR comprises a second portion of the casing arrival signal received at the second receiver, and FFT represents a fast Fourier transform calculation of a time-domain waveform.

3. The method of claim 1, comprising preprocessing the casing signal to remove noise, and wherein calculating the attenuation dispersion comprises calculating a spectral amplitude ratio of the casing arrivals, wherein the plurality of acoustic receivers comprises at least a first receiver and a second receiver, and wherein the spectral amplitude ratio is the ratio of the spectral amplitude of a first portion of the casing arrival signal received at the first receiver and of a second portion of the casing arrival signal received at the second receiver.

4. The method of claim 3, wherein detecting the discontinuity in the attenuation dispersion comprises determining whether the spectral amplitude ratio decreases below a threshold value.

5. The method of claim 3, wherein estimating the frequency at the detected discontinuity comprises identifying a first frequency at which the spectral amplitude ratio decreases below the threshold value, wherein the first frequency is the estimated frequency.

6. The method of claim 1, wherein calculating the attenuation dispersion comprises calculating a spectral amplitude ratio of the casing arrivals, and wherein detecting the discontinuity in the attenuation dispersion comprises determining whether a gradient of the spectral amplitude ratio increases above a threshold value.

7. The method of claim 5, wherein estimating the frequency at the detected discontinuity comprises identifying a first frequency at which the gradient increases above the threshold value, wherein the first frequency is the estimated frequency.

8. The method of claim 1, wherein estimating the wavespeed of the annulus based on the estimated frequency comprises:
calculating a phase difference based on the equation:

$$\phi(f)=\angle(FFT(CasingArrival\_FAR)/FFT(CasingArrival\_NEAR))$$

where $\phi(f)$ represents a phase difference related to flexural mode phase velocity dispersion, CasingArrival_NEAR comprises a first portion of the casing arrival signal received at the first receiver, CasingArrival_FAR comprises a second portion of the casing arrival signal received at the second receiver, and FFT represents a fast Fourier transform calculation of a time-domain waveform; and
wherein calculating the phase velocity dispersion is based on the equation:

$$v(f) = \frac{\Delta z}{t_0 - \frac{\phi(f) + 2n\pi}{2\pi f}}$$

where v(f) represents a flexural mode phase velocity dispersion, $\Delta z$ represents a spacing between the two acoustic receivers, $t_0$ represents a time shift applied before calculating the spectral amplitude ratio, and $2n\pi$ is the phase ambiguity for any integer n.

9. The method of claim 1, wherein calculating the phase velocity dispersion comprises using casing parameters including casing thickness, casing compressional and shear wavespeeds, casing density, and combinations thereof.

10. The method of claim 1, wherein calculating the phase velocity dispersion comprises using a mode search algorithm.

11. The method of claim 1, comprising identifying the estimated wavespeed as compressional or shear.

12. The method of claim 1, comprising iteratively outputting cement properties based on the iteratively estimated wavespeeds and plotting a time-lapse graph of the iteratively output cement properties, wherein the time-lapse graph represents an evolution of properties of the annulus over time.

13. A method for estimating an acoustic property of an annulus in a cement evaluation system, the method comprising:
acquiring, at a plurality of acoustic receivers in the cement evaluation system, a pitch-catch signal comprising acoustic waveforms that have propagated through a casing adjacent to the annulus;
extracting a casing arrival signal from the pitch-catch signal, wherein the casing arrival signal comprises early-arriving portions of the pitch-catch signal, and wherein the casing arrival signal is substantially devoid of later-arriving portions arising from reflections from the annulus or reflections from an interface of the annulus and a formation around the annulus;
compensating each casing arrival signal for lateral beam spreading using a lateral-beam spreading formula,
calculating a first attenuation dispersion of the compensated casing arrival signals based on portions of the casing arrival signal received at each receiver of the plurality of acoustic receivers;
calculating a second attenuation dispersion for the casing arrival signals using a mode search algorithm, based on guessed cement properties, wherein the mode search algorithm assumes a cement sheath having an infinite thickness;
calculating a mismatch between the first and second attenuation dispersions and updating the guessed cement properties until the mismatch is reduced below a threshold; and
outputting the updated cement properties once the mismatch is reduced below a threshold.

14. The method of claim 13, wherein estimating the first attenuation dispersion curve comprises compensating the casing arrival signals in the frequency domain according to the equation below:

$$Q(\omega) = S(\omega) \left| TR^2 + \frac{\omega^2 W_0^4 \sin^2(\alpha)}{v_f^2} \right|^{+\frac{1}{4}}$$

where $S(\omega)$ is the Fourier transform of the casing arrival signal received at one or more of the acoustic receivers at a distance TR from a transmitter of the cement evaluation system, $Q(\omega)$ is the compensated form of $(\omega)$; $\omega=2\pi f$ is the angular frequency; $v_f$ is a logging fluid wavespeed, and $W_0$ is a measure related to the receivers and the transmitter aperture sizes.

15. The method of claim 13, wherein the plurality of acoustic receivers comprises a first receiver and a second receiver, and wherein calculating the attenuation dispersion comprises calculating a spectral amplitude ratio of the casing arrivals is based on a spectral amplitude equation:

$$ATT(f) = 20 * \log 10(abs(Q(\omega)\_CasingArrival\_FAR) / abs(Q(\omega)\_CasingArrival\_NEAR))$$

where $Q(\omega)\_CasingArrival\_FAR$ comprises a compensated Fourier transform of the casing arrival signal received at the first receiver, $Q(\omega)\_CasingArrival\_NEAR$ comprises a compensated Fourier transform of the casing arrival signal received at the second receiver.

16. The method of claim 13, comprising iteratively outputting cement properties and plotting a time-lapse graph of the iteratively output cement properties, wherein the time-lapse graph represents an evolution of properties of the annulus over time.

17. A cement evaluation system for evaluating characteristics of an annulus material, the system comprising: one or more processors; a non-transitory tangible computer-readable memory coupled to the one or more processors and having executable computer code stored thereon, the computer code comprising a set of instructions that causes one or more processors to perform the following: identifying a casing arrival signal from waveforms received at a first receiver and a second receiver in a cement evaluation system; calculating a spectral amplitude ratio based on a relationship between waveforms received at the first receiver and the second receiver; scanning the spectral amplitude ratio in a frequency domain to identify discontinuities in the spectral amplitude ratio; identifying a frequency at which a first discontinuity occurs in the spectra amplitude ratio; and estimating wavespeed based on the identified frequency.

18. The cement evaluation system of claim 17, wherein the computer code comprises a set of instructions that causes one or more processors to perform the following: if discontinuities are not identified, calculating a first attenuation dispersion using a mode search algorithm; estimating a second attenuation dispersion using the casing arrival signal; estimating a wavespeed of the annulus; and updating the estimated wavespeed until the first attenuation dispersion matches the second attenuation dispersion.

19. The cement evaluation system of claim 17, wherein the ultrasonic downhole tool is conveyable by wireline.

20. The cement evaluation system of claim 17, wherein the ultrasonic downhole tool is suitable for logging-while-drilling tool.

* * * * *